(12) United States Patent
Monfort et al.

(10) Patent No.: US 9,143,062 B1
(45) Date of Patent: Sep. 22, 2015

(54) DIRECT CURRENT REGENERATION SYSTEM

(71) Applicants: Edward Riggs Monfort, Palm Harbor, FL (US); Dennis R. Di Ricco, Los Altos, CA (US)

(72) Inventors: Edward Riggs Monfort, Palm Harbor, FL (US); Dennis R. Di Ricco, Los Altos, CA (US)

(*) Notice: Subject to any disclaimer, the term of this patent is extended or adjusted under 35 U.S.C. 154(b) by 0 days.

(21) Appl. No.: 14/513,861

(22) Filed: Oct. 14, 2014

Related U.S. Application Data

(63) Continuation-in-part of application No. 13/791,926, filed on Mar. 9, 2013, now abandoned.

(51) Int. Cl.
*H02K 7/16* (2006.01)
*H02P 3/14* (2006.01)
*H02P 8/00* (2006.01)
*H02K 7/116* (2006.01)

(52) U.S. Cl.
CPC ......... *H02P 3/14* (2013.01); *H02K 7/116* (2013.01); *H02P 8/00* (2013.01)

(58) Field of Classification Search
CPC ........ H02K 16/00; H02K 16/02; H02K 47/04
USPC ............................................. 310/83, 112–114
See application file for complete search history.

(56) References Cited

U.S. PATENT DOCUMENTS

| | | | | |
|---|---|---|---|---|
| 4,222,512 A * | 9/1980 | Bugnone | ...................... | 226/181 |
| 4,536,668 A * | 8/1985 | Boyer | ........................ | 310/75 R |
| 5,512,022 A * | 4/1996 | Suzuki | ............................. | 475/2 |
| 5,606,230 A * | 2/1997 | Drury et al. | .................... | 318/41 |
| 7,786,640 B2 * | 8/2010 | Sada et al. | ..................... | 310/112 |
| 2003/0227227 A1* | 12/2003 | Tu et al. | .......................... | 310/92 |
| 2010/0033066 A1* | 2/2010 | Murata et al. | .............. | 310/68 R |
| 2011/0035136 A1* | 2/2011 | Niimi | ............................. | 701/110 |
| 2011/0083919 A1* | 4/2011 | Kshatriya | ................. | 180/65.26 |
| 2012/0118220 A1* | 5/2012 | Watanabe | .................... | 116/284 |

* cited by examiner

*Primary Examiner* — Naishadh Desai

(57) ABSTRACT

The system includes an electric alternating/direct current motor, a stepping motor, and a converter/inverter. The stepping motor is operatively coupled to the electric alternating/direct current motor. The electric alternating/direct current motor is located between the converter/inverter and the stepping motor. The stepping motor includes a gear assembly formed of a first gear and an axially aligned second gear and an intermediate gear operatively coupled between the first and second gears. A lever selectively couples and uncouples the first and second gears.

1 Claim, 3 Drawing Sheets

DIRECT CURRENT REGENERATION SYSTEM

RELATED APPLICATION

The present application is a continuation-in-part of pending application Ser. No. 13/791,926 filed Mar. 9, 2013, the subject matter of which is incorporated herein by reference.

BACKGROUND OF THE INVENTION

Field of the Invention

The present invention relates to a direct current regeneration system and more particularly pertains to operating small alternating current generator motors from an electric alternating/direct current motor and for converting the output of the generator motors into direct current for charging components, preferably batteries or, in the alternative, for charging capacitors, to power the electric motor, the operating and the converting and the charging being done in a safe, ecological, convenient and economical manner.

SUMMARY OF THE INVENTION

In view of the disadvantages inherent in the known types of regeneration systems of known designs and configurations now present in the prior art, the present invention provides an improved direct current regeneration system. As such, the general purpose of the present invention, which will be described subsequently in greater detail, is to provide a new and improved direct current regeneration system and method which has all the advantages of the prior art and none of the disadvantages.

To attain this, the present invention essentially comprises a direct current regeneration system. The system includes an electric alternating/direct current motor, a stepping motor, and a converter/inverter. The stepping motor is operatively coupled to the electric alternating/direct current motor. The electric alternating/direct current motor is located between the converter/inverter and the stepping motor. The stepping motor includes a gear assembly formed of a first gear and an axially aligned second gear and an intermediate gear operatively coupled between the first and second gears. A lever selectively couples and uncouples the first and second gears. In an alternative embodiment, such coupling and uncoupling is adapted to be achieved through an electronic device.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved direct current regeneration system which has all of the advantages of the prior art regeneration systems of known designs and configurations and none of the disadvantages.

It is another object of the present invention to provide a new and improved direct current regeneration system which may be easily and efficiently manufactured and marketed.

It is further object of the present invention to provide a new and improved direct current regeneration system which is of durable and reliable constructions.

An even further object of the present invention is to provide a new and improved direct current regeneration system which is susceptible of a low cost of manufacture with regard to both materials and labor, and which accordingly is then susceptible of low prices of sale to the consuming public, thereby making such direct current regeneration system economically available to the buying public.

Even still another object of the present invention is to provide a direct current regeneration system for operating small alternating current generator motors from an electric alternating/direct current motor and for converting the output of the generator motors into direct current for charging batteries to power the electric motor, the operating and the converting and the charging being done in a safe, ecological, convenient and economical manner.

Lastly, it is an object of the present invention to provide a new and improved direct current regeneration system. The system is for operating small alternating/direct current generator motors from an electric alternating/direct current motor and for converting the output of the generator motors into direct current for charging electrical powering components chosen from the class of electrical powering components including batteries and capacitors to power the electric motor. The operating and the converting and the charging being done in a safe, ecological, convenient and economical manner, These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures of the primary embodiment of the invention.

DESCRIPTION OF THE PREFERRED EMBODIMENT

Figures 1, 2:
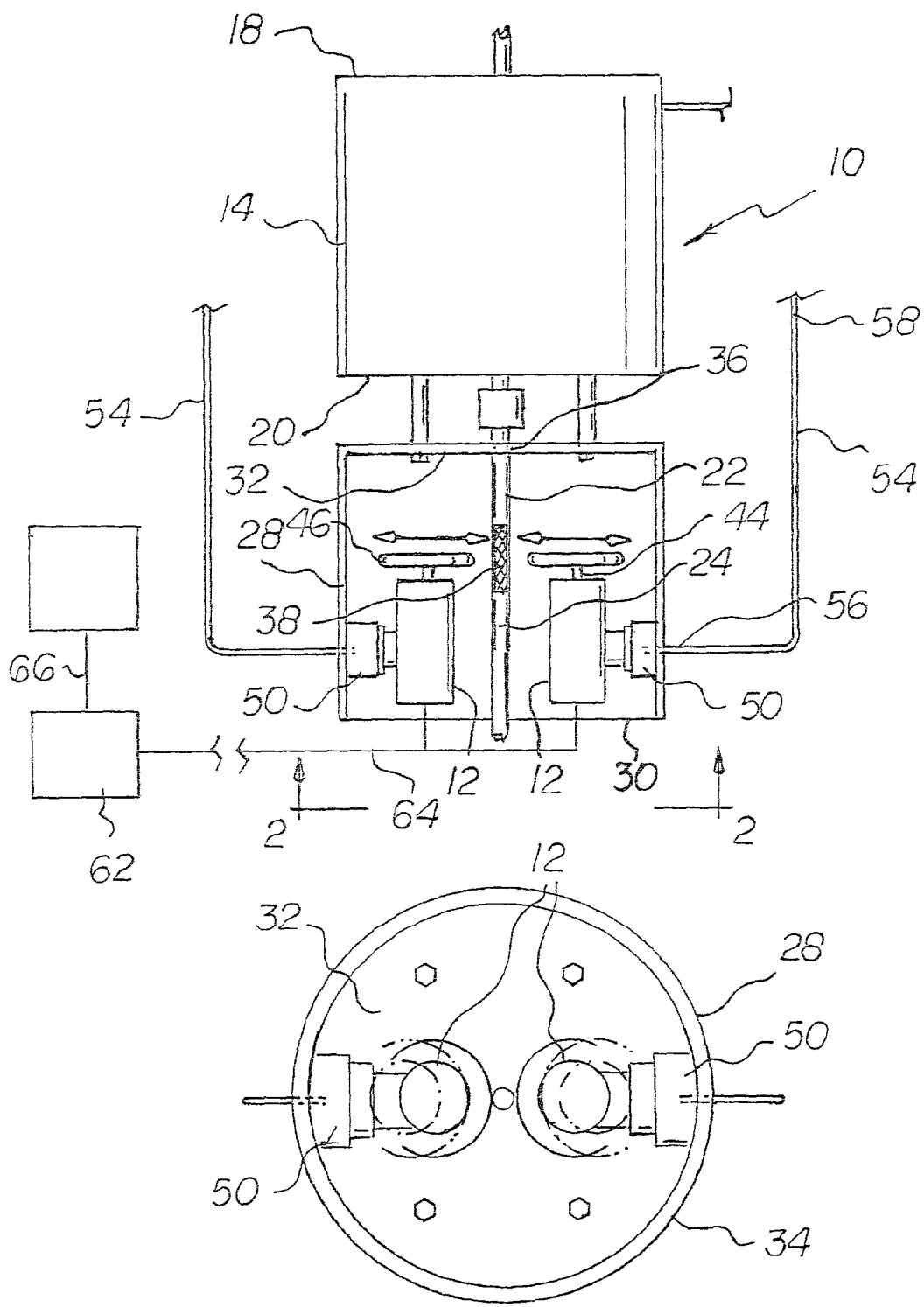
FIG. 1 is a plan view of a direct current regeneration system constructed in accordance with the principles of the present invention.
FIG. 2 is a front elevational view taken long line 2-2 of FIG. 1.

With reference now to the drawings, and in particular to FIG. 1 thereof, the preferred embodiment of the new and improved direct current regeneration system embodying the principles and concepts of the present invention and generally designated by the reference numeral 10 will be described.

The present invention, the direct current regeneration system 10 is comprised of a plurality of components. Such components in their broadest context include a motor, a housing, generators, and a support. Such components are individually configured and correlated with respect to each other so as to attain the desired objective.

First provided is an electric direct current motor 14, either an alternating current motor or a direct current motor. The electric direct current motor is adapted to be mounted in a vehicle. In this manner the electric current motor powers the vehicle. The electric direct current motor has a rearward end 18. The electric direct current motor has a forward end 20. The electric direct current motor has a central shaft 22. The central shaft has a rearward extent. The rearward extent is located outside of the electric direct current motor. The central shaft has a central shaft forward end 24. The central shaft has a forward extension located forwardly of the electric direct current motors. The central shaft is rotatable about a horizontally oriented central axis. The direct current motor is adapted to be powered by a battery or a capacitor.

A cylindrical housing 28 is provided. The housing has a circular forward section 30. The housing has a circular rearward section 32. The housing has a cylindrical side wall 34. The rearward section of the housing is coupled to the forward end of the electric direct current motor. The rearward section of the housing has an aperture 36. The aperture is provided in the rearward end of the electric current motor in the rearward section of the housing and the forward end of the electric direct current motor. The central shaft has a knurled section 38. The knurled section is rotatable in response to the powering of the electric direct current motor. A sealed high temperature bearing is provided on each end of the central shaft.

Two or more similarly configured alternating current generators 12 or direct current generators are provided, hereinafter referred to as alternating/direct current motors. The alternating/direct current motors 12, the alternating current generators or direct current generators are provided within the housing. Each alternating current generator or direct current generators has a drive shaft 44. The drive shaft has a drive wheel 46. The drive shafts are horizontally oriented. The drive shafts are provided parallel with each other and parallel with the central shaft. The drive shafts are located in a horizontal plane with the central shaft centrally between the drive shafts.

Provided next are two similarly configured supports 50. Each support couples an associated alternating current generator or direct current generators to the side wall of the housing. The supports are movable to move the alternating current generators or direct current generators and drive shafts equally and oppositely between a retracted position and an advanced position. In the retracted position the alternating current generators or direct current generators and drive shafts are provided adjacent to the side wall of the housing. In the advanced position the alternating current generators or direct current generators and drive shafts are provided adjacent to the central shaft.

Further provided are two similarly configured electric and/or hydraulic and/or pneumatic lines 54. Each hydraulic line has a first end 56. The first end is coupled to an associated one of the supports. Each hydraulic line has a second end 58. The second end is adapted to be coupled to a vehicle brake. In this manner when the brake is depressed and activated, the supports will move the alternating current generators or direct current generators and drive shafts and drive wheels to the advanced positioned. In the advanced position the drive wheels are provided in contact with the knurled section of the central shaft. Further in this manner the alternating current generators or direct current generators will convert rotation of the central shaft into electrical energy.

Provided last is an alternating or direct current to direct current converter/inverter 62, either a converter or an inverter. Input lines 64 are provided. The input lines are provided from the alternating or direct current generators to the converter/inverter. An output line 66 is provided. The output line is provided from the converter/inverter to a battery or capacitor. In this manner the electric alternating/direct current motor is powered. The converter/inverter is adapted to convert an alternating or direct current input to a direct current output or a direct current to direct current output.

In an alternate embodiment of the invention, the generator functions to create direct current from the mechanical rotation of the central shaft. In this embodiment, the alternating current to direct current converter/inverter can be eliminated and the lines from the generators go directly to the battery which is adapted to power the motor.

Figure 3:
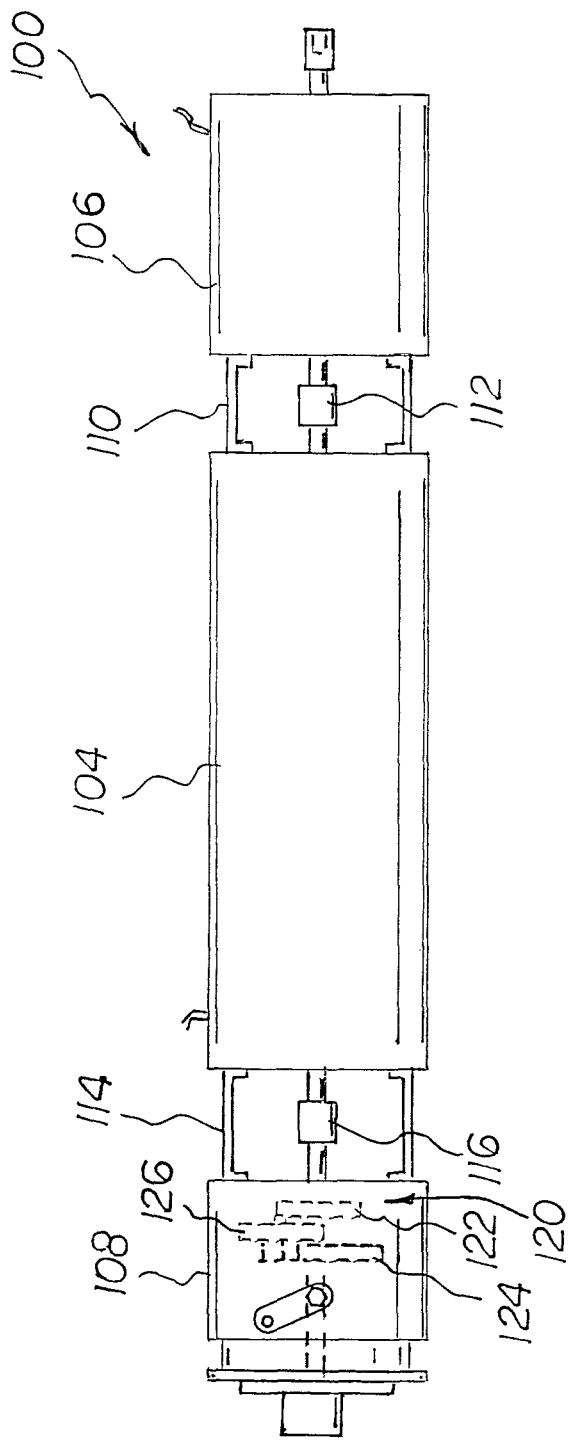
FIG. 3 is a side elevational view of an alternate embodiment of the invention.
Figure 4:
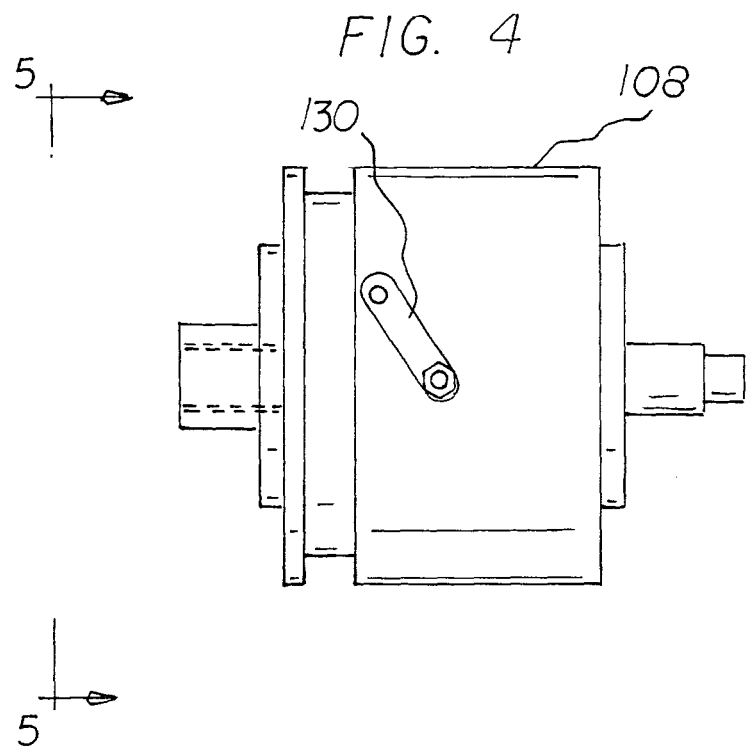
FIG. 4 is an enlarged side elevational view of the stepping motor shown in FIG. 3.
Figure 5:
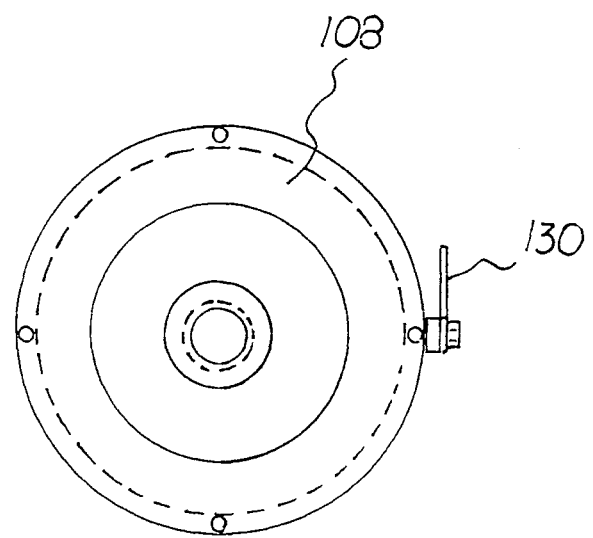
FIG. 5 is an end elevational view taken along line 5-5 of FIG. 4.

A further alternate embodiment of the invention is illustrated in FIG. 3. In such alternate embodiment, the system 100 includes the electric alternating/direct current motor 104 as described above. Such electric alternating/direct current motor has a rotatable primary shaft extending there through. Also included in the system is a current converter/inverter 106 as described above with a rotatable secondary shaft extending there through. Unlike the prior embodiment, the system of the alternate embodiment includes a stepping motor 108, preferably a two step stepping motor.

The stepping motor includes a tertiary shaft extending there through. The primary and secondary and tertiary shafts are all in axial alignment. A first set of support posts 110 couple the current converter/inverter and the electric alternating/direct current motor with a front coupler 112 joining the primary and secondary shafts. A second set of support posts 114 couple the stepping motor and the electric alternating/direct current motor with a rear coupler 116 joining the primary and tertiary shafts. The stepping motor has been found to provide added pickup to the performance of the system when accelerating from a stopped orientation such as at a traffic light when turning green.

The stepping motor may take any of a plurality of forms. As an example, one type is the Strong Box Underdrive Kits as manufactured and sold by Behemoth Drivetrain, L.L.C., of Leitchfield, Ky., the subject matte of which is incorporate herein by reference.

A stepping motor 108 is operatively coupled to the electric alternating/direct current motor 104. The electric alternating/direct current motor is located between the converter/inverter and the stepping motor. The stepping motor includes a gear assembly 120 formed of a first gear 122 and an axially aligned second gear 124 and an intermediate gear 126 operatively coupled between the first and second gears. The stepping motor also including a lever 130 coupled to the gear assembly to selectively couple and uncouple the first and second gears.

This is the first ever direct current regeneration device. This system works with an existing alternating/direct current motor. The direct current regeneration device will be bolted to the front of the motor. This device will have about the same diameter as that of the electric motor to which it is attached. This regeneration device will have an internal shaft with the same diameter as the electric motor shaft. The regeneration device is coupled to the electric motor shaft. The regeneration shaft will be scored into a rough knurled surface. There will be a sealed high temperature bearing on each side of the shaft of the regeneration device sealing the internal components of the direct current regeneration device.

Wheels with small generator motors are attached to the wheels which will move inward and outward from the direct current regeneration device shaft acting like a brake drum when the vehicle foot pedal is pressed. The harder the pressure from the vehicle brake foot pedal, the closer these wheels come to the direct current regeneration device shaft. In an alternative embodiment, actuation my be achieved through a clutch. In such embodiment, we could use one AC generator with a shaft on each end, no wheels and no brake drum-like apparatus, just a generator motor with a shaft on both ends. A clutch on the face of the generator would activate the AC generator once the brake was applied by the operator and once the clutch was activated by the brake pedal on the vehicle then it would send regenerated energy back to the battery pack.

Attached to the internal of the direct current regeneration device will be a braking mechanism that works similarly to a brake drum. Once the hydraulics are active by the foot brake in the vehicle, an inward pressure will be created pushing the wheels onto the rough part of the direct current regeneration device shaft. Every time the vehicle foot brake pedal is pressed the direct current regeneration device wheels turn and electricity is generated back to the batteries.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A direct current regeneration system (10) for operating small alternating/direct current generator motors (12) from an electric direct current motor (14) and for converting the output of the generator motors into direct current for charging electrical powering components chosen from the class of electrical powering components including batteries and capacitors to power the electric motor, the operating and the converting and the charging being done in a safe, ecological, convenient and economical manner, the system comprising, in combination:

an electric alternating/direct current motor (12/104) adapted to be mounted in a vehicle for the powering thereof, the electric alternating/direct current motor having a rearward end (18) and a forward end (20), the electric alternating/direct current motor having a central shaft (22) with a rearward extent being located within the electric alternating/direct current motor, the central shaft having a central shaft forward end (24) extending forwardly of the electric alternating/direct current motor, the central shaft being rotatable about a horizontally oriented central axis, the alternating/direct current motor adapted to be powered by a battery;

a cylindrical housing (28) having a circular forward section (30) and a circular rearward section (32) and a cylindrical side wall (34), the rearward section of the housing coupled to the forward end of the electric alternating/direct current motor, an aperture (36) in the rearward section of the housing and the forward end of the electric alternating/direct current motor, the central shaft having a knurled section (38) rotatable in response to the powering of the electric alternating/direct current motor;

two similarly configured alternating/direct current generators (12) within the housing, each alternating current generator having a drive shaft (44) with a drive wheel (46), the drive shafts being horizontally oriented parallel with each other and parallel with the central shaft, the drive shafts being located in a horizontal plane with the central shaft centrally between the drive shafts;

two similarly configured supports (50), each support coupling an associated alternating current generator to the side wall of the housing, the supports being movable to move the alternating/direct current generators and drive shafts equally and oppositely between a retracted position adjacent to the side wall of the housing and an advanced position adjacent to the central shaft;

two similarly configured lines (54) chosen from the class of lines including electric and hydraulic and pneumatic lines, each line having a first end (56) coupled to an associated one of the supports, each line having a second end 58 adapted to be coupled to a vehicle brake whereby when the brake is depressed and activated, the supports will move the alternating/direct current generators and drive shafts and drive wheels to the advanced positioned with the drive wheels being in contact with the knurled section of the central shaft whereby the alternating/direct current generators will convert rotation of the central shaft into electrical energy;

an alternating/direct current to direct current converter/inverter (62/106), input lines (64) from the alternating/direct current generators to the converter/inverter, an output line (66) from the converter/inverter to a battery for powering the electric alternating/direct current motor, the converter/inverter adapted to convert an alternating/direct current input to a direct current output; and a stepping motor (108) operatively coupled to the electric alternating/direct current motor (104), the electric alternating/direct current motor being located between the converter/inverter and the stepping motor, the stepping motor including a gear assembly (120) formed of a first gear (122) and an axially aligned second gear (124) and an intermediate gear (126) operatively coupled between the first and second gears, the stepping motor also including a lever (130) coupled to the gear assembly to selectively couple and uncouple the first and second gears.

\* \* \* \* \*